(No Model.) 2 Sheets—Sheet 1.
E. S. McEWEN & O. R. ADAMS.
Cultivator
No. 239,523. Patented March 29, 1881.
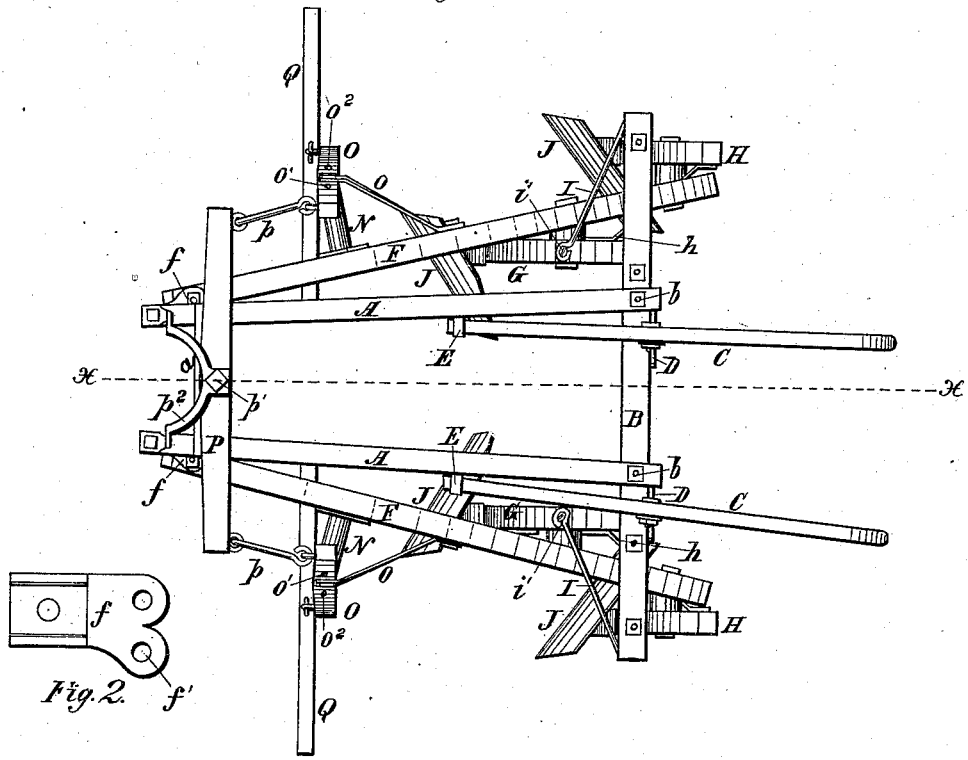
Fig. 1.
Fig. 2.
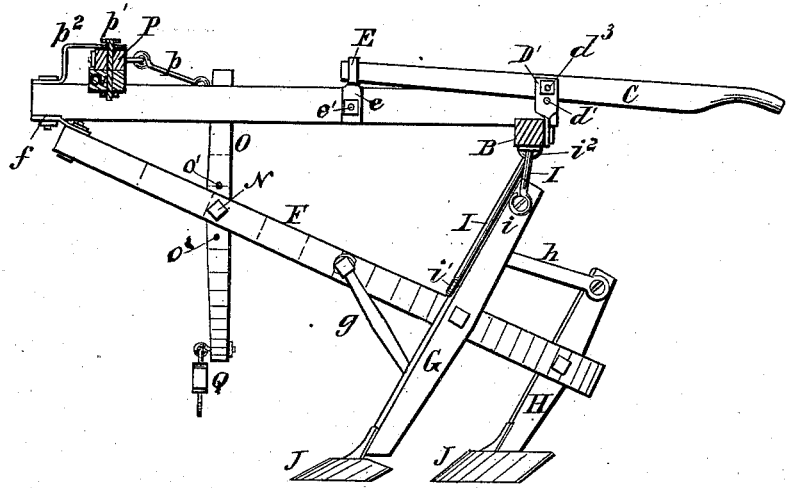
Fig. 3.
Witnesses
Inventors
Ezra S. McEwen
& Oliver R. Adams
By Coburn & Thacher
Attorneys (No Model.) 2 Sheets—Sheet 2.
E. S. McEWEN & O. R. ADAMS.
Cultivator
No. 239,523. Patented March 29, 1881.
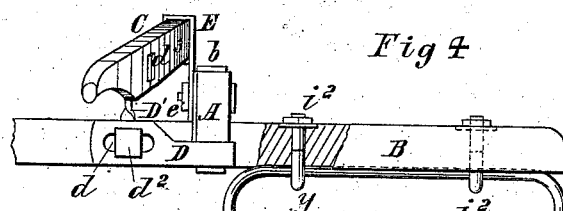
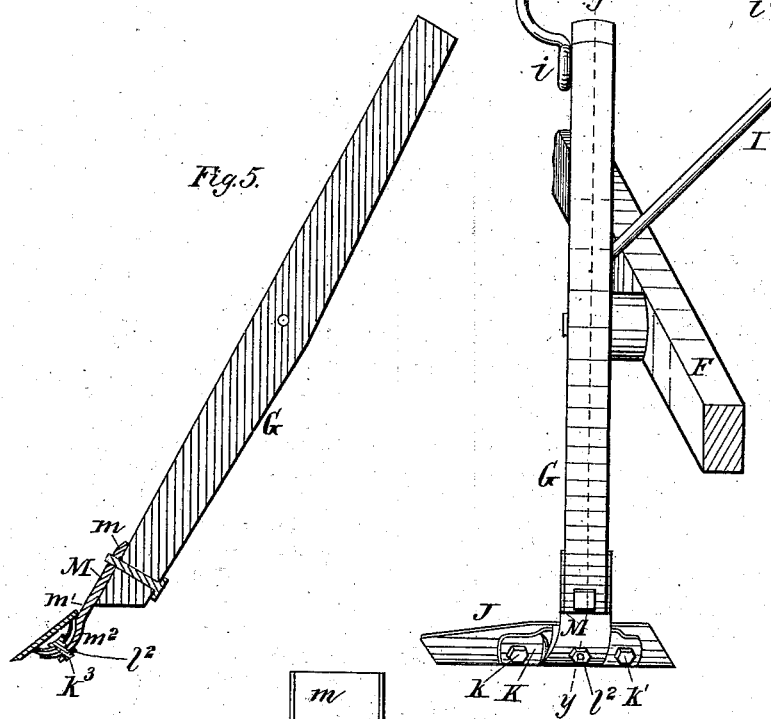
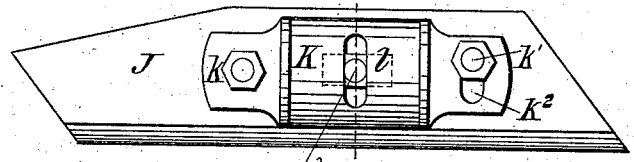
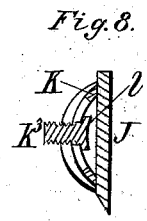
Witnesses
Inventors
Ezra S. McEwen
& Oliver R. Adams
By Coburn & Thacher
Attorneys

UNITED STATES PATENT OFFICE.

EZRA S. McEWEN, OF LISBON, AND OLIVER R. ADAMS, OF MARSEILLES, ILLINOIS.

CULTIVATOR.

SPECIFICATION forming part of Letters Patent No. 239,523, dated March 29, 1881.

Application filed June 24, 1880. (No model.)

*To all whom it may concern:*

Be it known that we, EZRA S. McEWEN, of Lisbon, in the county of Kendall and State of Illinois, and OLIVER R. ADAMS, of Marseilles, in the county of La Salle and State of Illinois, have invented certain new and useful Improvements in Corn-Cultivators; and we do hereby declare that the following is a full, clear, and exact description of the same, reference being had to the accompanying drawings, in which—

Figure 1 is a plan view of a cultivator having our improvements. Fig. 2 is an enlarged representation of the coupling of the plow-beams to the main frame. Fig. 3 represents a longitudinal vertical section on the line $x\ x$ in Fig. 1. Fig. 4 is an enlarged rear elevation of an inner plow standard and blade and one handle, with the adjoining portions of the corresponding plow-beam and of the main frame, the latter partly in section. Fig. 5 is a section of the same plow standard and blade on the line $y\ y$ in Fig. 4. Fig. 6 is a rear elevation, enlarged from the scale of Fig. 4, of the blade having the slotted shoe and flanged screw-bolt, by means of which it is attached to the standard. Fig. 7 is a similarly-enlarged rear elevation of the coupling by which the shoe on the blade is connected with the standard. Fig. 8 represents a section on the line $z\ z$ in Fig. 6.

The same letters denote the same parts in all the figures.

Our invention relates to apparatus for turning up the earth between the rows of corn, commonly known as "cultivators;" and it consists in improved devices for adjustably attaching the plow standards, beams, and handles to the main frame, and for adjustably attaching the blades to the standards, and in vertical draft-equalizers having whiffletrees attached to their lower ends and themselves adjustably attached to the plow-beams, the object being the more ready adaptation of the cultivator to the various uses to which it is necessarily put. These improvements we will now proceed to describe in detail.

In the drawings, A A denote the longitudinal beams of the main frame, connected near their forward ends by the cross-beam $a$.

B denotes the main transverse beam, set into rabbets in the beams A, and held there by the bolts $p$.

The plow-handles C are attached to the beam B by means of the couplings D D′, each consisting of a lower plate, D, rigidly connected with a smaller upper plate, D′, set at right angles to it. In D is the slot $d$, through which passes the screw-bolt $d^2$, the slot being of such a length that by slightly loosening the nut on the head of the bolt the position of the plate may be changed along a right and left line. In the upper plate, D′, are the holes $d'$, one above the other. The screw-bolt $d^3$ passes through one of these and the handle C, which is thus attached to the transverse beam B. The forward end of each handle is set in a clevis, E, having one of its sides extended downward, so as to form the plate $e$. A hole in $e$ allows the passage of the screw-bolt $e'$, by means of which the clevis is fixed to either side of the longitudinal beam A. The clevis is large enough to allow some lateral play to the handle, so that by adjusting the slotted plates D the distances between the rear ends of the handles may be correspondingly varied, or, without varying the distance between them, the handles may be together moved to the right or left. By loosening the nut at one end of $e'$ the angle of the clevis to the length of the beam B may be changed, so as, in connection with the different holes $d'$ in the plate D′, to admit of raising or depressing the rear ends of the handles.

The plow-beams F are attached at their forward ends to the beams A by means of the coupling $f$, each having holes for the passage of screw-bolts, fixing it to A and F, respectively. The portion of $f$ which is affixed to F is wider than the rest, and has several holes, $f'$, side by side, so as to admit of varying the distance between the forward ends of the beams.

The inner plow-standards, G, and the outer plow-standards, H, are attached to the beams F at any usual points and in any usual manner. Each outer standard is rigidly connected with the corresponding inner standard by the brace $h$. In like manner the standards G are held firmly in their positions with reference to the beams F by the braces $g$, making a connection with the beams at additional points on both F and G. Each of the inner standards, G, is also fastened to the beam B of the main frame by the bent rod I, the two ends of which are secured in any suitable mode to G on the inner side, near the upper end, and on the front side, near the point of main attachment to the beam F, at $i$ and $i'$, respectively. The mode of fastening shown in the drawings is by bending the end of the rod into the shape of a hook and holding this in place by a screw driven through it into the beam, and having a head large enough to close on the hook. This rod is bent into the general shape of a Z with the lower horizontal line cut off. The upper horizontal line extends along the lower side of the beam B some little distance within and a greater distance without the point $i$ of attachment to G, and is secured to B by the hook-staples $i^2$, passing through B and terminating above in screw-bolts, by means of which they may be held tightly in place or loosened so as to allow the rod I to be slid through them to the right or left, and thus impart a similar motion to the plow-standards G and H, which is facilitated by the adjustable attachment of the plow-beam to A at $f'$. The distance between the pairs of blades may thus be increased or diminished according to the distance desired between the furrows.

On the back of each of the blades J is an adjustable shoe, K, having two wings fastened to the blade by pins at $k$ and $k'$, and held firmly in place by nuts on the ends of the pins next the shoe. By loosening these nuts the shoe may be made to turn as on a pivot, at $k$, to an extent limited by the length of a slot, $k^2$, in which the pin $k'$ is set. The middle part of the shoe is arched, having its concavity toward the blade, which it touches with its edges only. A slot, $t$, in this middle portion, having its greatest length in the same direction as the curvature of the arch, receives the threaded pin $k^3$. This has a flange, $l$, on its bottom, which prevents it from getting out of the slot, and when the nut on its head is tightened holds it firmly in place by hugging the lower surface of the arch. By loosening the nut the position of the screw may be shifted toward the upper or lower edge of the arch, thereby changing the angle of the surface of the blade to the ground, and by its different positions enabling the earth to slide over it freely or be thrown to the row at the will of the operator.

On the lowest part of the forward side of each of the plow-standards G and H is rigidly attached a coupling, M. The part $m$ consists of a plate, which lies flat on the front of the standard, and has on its sides two short flanges, which clasp the two sides of the standard, so that the coupling is prevented from shifting to the right or left. The part $m^2$, which lies on the arch of the shoe, is curved to fit the convexity of that arch, and is also turned inward, or toward the similar standard on the other side of the cultivator. The outer end of the threaded pin $k^3$ passes through a hole in $m^2$ and fits in a nut, $l^2$, on the outer side of $m^2$, so that the blade is readily fastened to the coupling and detached therefrom. These two parts are connected by a middle portion, $m'$, which, at its inner edge, has the same direction as the part $m$, but at its outer edge is bent forward, so as to bring the outer edge of the blade in advance of the inner. The inward direction of the part $m^2$ causes the outer edge of the blade to be lower than the inner, as compared with the plane of the two plow-beams, and the degree of this depression may be varied by changing the position of the shoe by means of the pins and nuts at $k$ and $k'$ and the slot $k^2$, the extent of variation being limited by the length of the slot.

From the outer side of each plow-beam, near the forward end, projects horizontally a shaft, N, on the end of which an upright evener, O, is pivoted, near its middle point. The upper end of O is connected by the hooked rod $p$ with one end of the horizontal evener P, which is pivoted at $p'$ on the middle point of the cross-beam $a$, the pivot being braced by means of the yoke-iron $p^2$. The pivoted supports of the upright eveners are secured in place by the braces $o$, detachably connected by screw-bolts with the shafts N and the plow-beams.

By means of several holes, $o'$ $o^2$, in them at different heights, the eveners O may be pivoted at correspondingly different points, so as to raise or lower the whiffletrees Q, which are attached to their lower ends by ring-bolts, thereby regulating the amount of downward pressure at the forward end of the tongue; or, by pivoting one upright evener at a higher point of its length than the opposite one, and thus increasing the distance of its lower end from the fulcrum, the horse on that side can be given an advantage over his fellow.

What we claim as our invention, and desire to secure by Letters Patent, is—

1. The plow-standards G, adjustably attached to the main frame by the bent rods I, in combination with plow-beams and suitable mechanism for attaching them to the main frame, which permits them to be adjusted laterally, substantially as and for the purpose described.

2. The plow-standards G, adjustably attached to the main frame by the bent rods I, in combination with the plow-beams F, adjustably attached to the main frame by the couplings $f$, substantially as and for the purpose described.

3. In a cultivator, a blade, in combination with a fixed coupling-block having a concave seat at its outer end, and a shoe arched to correspond with the concavity of the coupling-block, and adjustably attached thereto by means of a bolt and a slot following the curvature of the arch, and also adjustable on the blade by means of a pivotal bolt at one end and a bolt and slot at the other, substantially as and for the purpose described.

4. The blade J and the convex shoe K, provided with the pivot-bolt $k$ and slots $k^2$ and $t$, in combination with the coupling-block M, having the concave seat $m^2$, and with the standard G, substantially as and for the purposes described.

5. The couplings D D', shaped as described, and provided with the slots $d$ and perforations $d'$, for the purpose of making the plow-handles laterally and vertically adjustable independently of each other.

E. S. McEWEN.
OLIVER R. ADAMS.

Witnesses as to the signature of E. S. McEwen:
JOHN H. NADEN,
CHARLES D. BARROWS.

Witnesses as to the signature of Oliver R. Adams:
J. Q. ADAMS,
CHAS. H. ADAMS.